(12) United States Patent
Millington

(10) Patent No.: US 6,175,801 B1
(45) Date of Patent: Jan. 16, 2001

(54) NAVIGATION SYSTEM MAP PANNING DIRECTIONAL INDICATOR

(75) Inventor: Jeffrey Alan Millington, Rochester Hills, MI (US)

(73) Assignee: Magelan DTS, Inc., Rochester Hills, MI (US)

(*) Notice: Under 35 U.S.C. 154(b), the term of this patent shall be extended for 0 days.

(21) Appl. No.: 09/100,683

(22) Filed: Jun. 19, 1998

Related U.S. Application Data

(60) Provisional application No. 60/084,294, filed on May 5, 1998.

(51) Int. Cl.[7] .................................................. G06G 7/78
(52) U.S. Cl. .......................... 701/207; 701/208; 701/211; 701/213; 701/224
(58) Field of Search ................................... 701/207, 208, 701/211, 213, 224, 340, 98, 99, 95

(56) References Cited

U.S. PATENT DOCUMENTS

| | | | |
|---|---|---|---|
| 4,912,645 | * 3/1990 | Kakihara et al. | 364/449 |
| 4,914,605 | 4/1990 | Loughmiller, Jr. et al. | 364/518 |
| 5,067,081 | 11/1991 | Person | 364/444 |
| 5,089,826 | 2/1992 | Yano et al. | 342/457 |
| 5,124,924 | 6/1992 | Fukushima et al. | 364/449 |
| 5,307,277 | * 4/1994 | Hirano | 364/449 |
| 5,410,485 | * 4/1995 | Ichikawa | 364/444 |
| 5,617,319 | 4/1997 | Arakawa et al. | 364/449.1 |
| 5,646,856 | * 7/1997 | Kaesser | 364/449.4 |
| 5,742,923 | * 4/1998 | Odagawa | 701/207 |
| 5,796,613 | * 8/1998 | Kato et al. | 364/449.8 |

FOREIGN PATENT DOCUMENTS 0896315    6/1999  (EP) .

OTHER PUBLICATIONS

Magellan, "1997 Magellan Products Anywhere To Anywhere Satellite Navigation and Communication", 1997, pp. 1–20.

* cited by examiner

Primary Examiner—William A. Cuchlinski, Jr.
Assistant Examiner—Marthe Marc-Coleman
(74) Attorney, Agent, or Firm—Carlso, Gaskey & Olds

(57) ABSTRACT

The invention relates to a map panning directional indicator for a navigation system. A display device of the navigation system displays the map panning indicator, which indicates both a current heading between a map panning cursor and a current vehicle location relative to a map database and a distance between the map panning cursor and the current vehicle location. The map panning cursor is displayed in the center of a map section as a user pans over map sections of the map database, which are displayed on the display device.

22 Claims, 2 Drawing Sheets

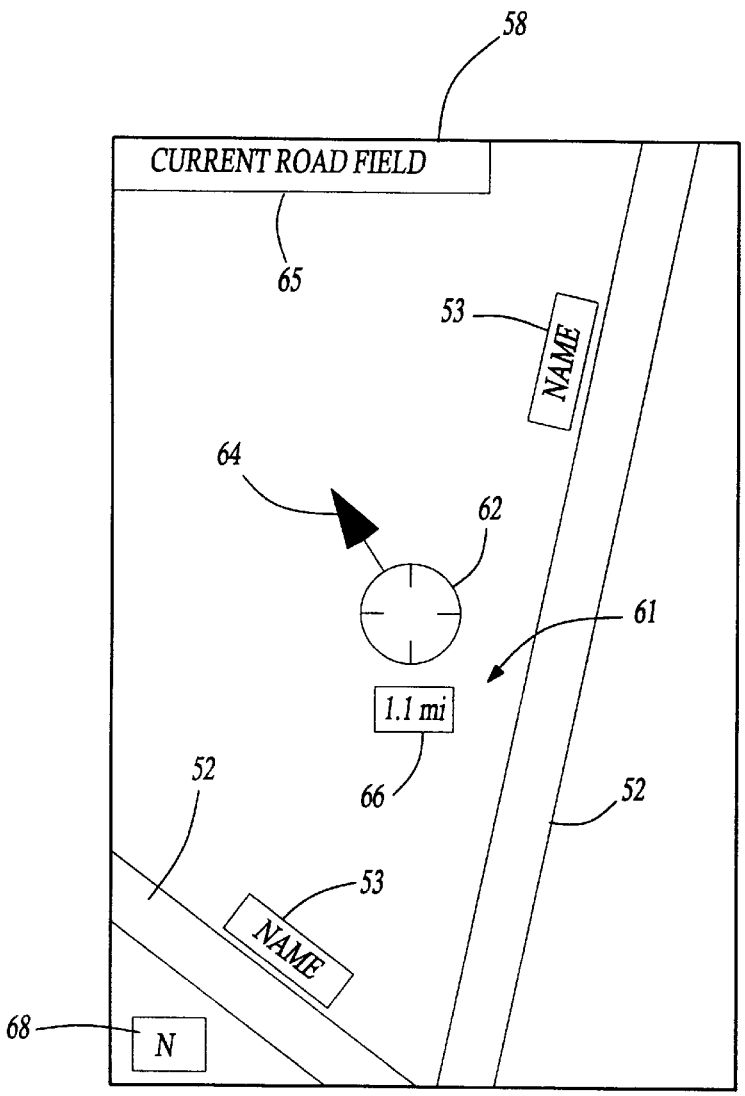
_Fig-3_
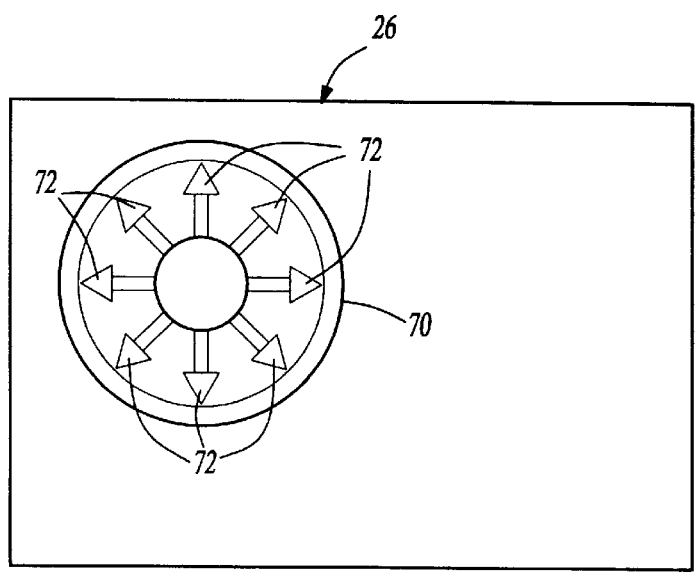
_Fig-4_

NAVIGATION SYSTEM MAP PANNING DIRECTIONAL INDICATOR

This application claims benefit of United States Provisional Patent application Ser. No. 60/084,294 filed May 5, 1998.

BACKGROUND OF THE INVENTION

This invention generally relates to navigation or route guidance systems and, more particularly, to a map panning directional indicator for a navigation guidance system.

Navigation systems generally provide a recommended route from a starting point to a desired destination. Generally, the starting point and desired destination are selected from a large map database having a plurality of roads stored in a mass media storage, such as a CD ROM or hard drive, which includes the roads in the area to be travelled by the user. The navigation system can be located in a personal computer or it can be installed in a vehicle. If the navigation system is installed in a vehicle, the starting point is typically the current position of the vehicle, which can be input to the navigation system by an associated position determining system that usually includes a GPS (Global Positioning System) receiver.

The navigation system determines a route from the starting point to the destination utilizing an algorithm well-known to those in the art and currently in use in many navigation systems. Usually there are many potential routes between the selected starting point and the desired destination. Typical navigation systems select a recommended route based upon certain "cost" values associated with each segment of road in the map database. These cost values include the length of the road segment and the estimated time of travel through the road segment. The navigation system selects the potential route with the lowest total cost to be the recommended route. Depending upon the predetermined algorithm of the navigation system, the navigation system will recommend the route with the shortest total length, the lowest total time, or some weighted average of length and time.

The recommended route is then displayed to the user on a map showing the starting point and desired destination and highlighting the recommended route. Preferably, if the navigation system is installed in a vehicle, the navigation system displays the current position of the vehicle and provides turn-by-turn instructions to the driver, guiding the driver to the selected destination.

The size of a section of the map database that can be shown legibly is limited by the size of a display device of the navigation system. Frequently, a user wishes to see areas of the map database that are not currently displayed. Thus, the typical navigation system permits a user to pan or scroll to other areas of the map database and to display the panned map section. Many times the panned map section does not include the current vehicle location. The typical navigation system does not provide any indication to the user regarding either the relative distance between the current vehicle location and the panned map section or the direction of the current vehicle position relative to the panned map section.

Thus, it is desirable to provide a map panning directional indicator that continuously informs the user regarding both the distance between a panned map section and the current vehicle location and the direction of the current vehicle location relative to the panned map section.

SUMMARY OF THE INVENTION

In general terms, this invention provides a map panning directional indicator that shows a user the distance between a first position and a panned map section and the direction of the first position relative to the panned map section.

A user utilizes a directional user input device to pan from the first position to a second position, which may be on another portion of a map database. The portion of the map database is displayed on a display device. As the user pans, a CPU determines a heading from a cursor located at the second position to the first position. The heading is determined by computing the angle between the latitude and longitude coordinates of the first position and the latitude and longitude coordinates of the panning cursor. The computed angle is used to index an array of pre-rendered bitmaps that define the position of a directional arrow that is connected to the panning cursor and that points toward the first position. The CPU also calculates the straight line distance between the panning cursor and the first position and displays the distance adjacent the panning cursor. Preferably, the navigation system is located in a vehicle and the first position is a current location of the vehicle.

These and other features and advantages of this invention will become more apparent to those skilled in the art from the following detailed description of the presently preferred embodiment. The drawings that accompany the detailed description can be described as follows.

BRIEF DESCRIPTION OF THE DRAWINGS

FIG. 3 is a screen display of one of the screen sections shown in FIG. 2; and

FIG. 4 is a top plan view of a directional user input device.

DETAILED DESCRIPTION OF THE PREFERRED EMBODIMENT

Figure 1:
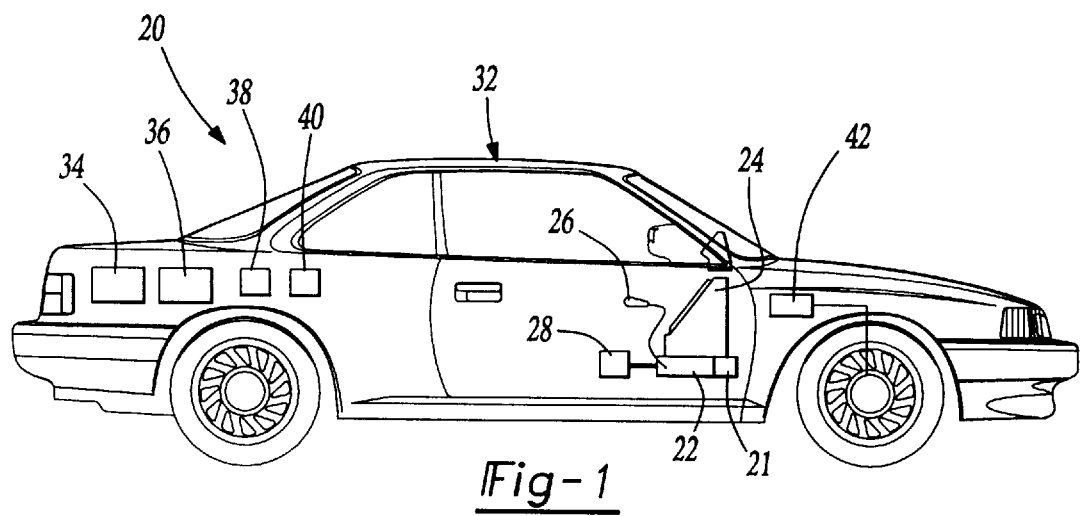
FIG. 1 is a schematic of a navigation system with a map panning directional indicator of the present invention installed in a vehicle.

The navigation system 20 of the present invention is shown schematically in FIG. 1. The navigation system 20 includes a CPU 22 (Central Processing Unit) having a route determination system 21 and connected to a display device 24, such as a high resolution LCD or flat panel display. The CPU 22 is also connected to a directional user input device 26. The navigation system 20 further includes a map database 28 connected to the CPU 22. The map database 28 is a mass media storage device, such as a CD ROM or hard drive, which includes a map having all the roads in the area to be travelled by the user. Each road in the map database 28 is divided into road segments, each having an associated set of cost values, which indicate the "cost" of traveling that road segment. For example, the cost values may include the length of the road segment, the estimated time to travel the road segment, and the type of road (i.e., highway, secondary road, toll road, one way, etc.).

The navigation system 20 can, but need not, be installed in a vehicle 32. The navigation system 20 can be used in conjunction with position determining devices, such as a GPS receiver 34, a gyroscope 36, a compass 38, an orthogonal multi-axis accelerometer 40 and a wheel speed sensor 42, all connected to the CPU 22 (connections not shown for simplicity). Such position determining devices are well-known and are commercially available. Preferably, a combination of these position determining devices is utilized. Using known software algorithms and technologies, such as dead-reckoning or map-matching or others, the CPU 22 in combination with the position determining device determines the current position of the navigation system 20 or the vehicle 32 relative to the map database 28.

The route determination system 21 in the CPU 22 determines a route from a beginning point to a destination point. When the navigation system is installed in vehicle 32, the current position of vehicle 32 is preferably used as the beginning point and a user selects a destination point. In use of the present invention, preferably the destination point is the location of cursor 62 (see FIG. 2). Preferably, the beginning point and destination point are points on road segments on the map database 28. As will be understood by one having ordinarily skill in the art, the beginning point and destination point could be any points on the map database 28, such as off-road points. The CPU 22 then displays at least a portion of the determined route on the display device 24.

Figure 2:
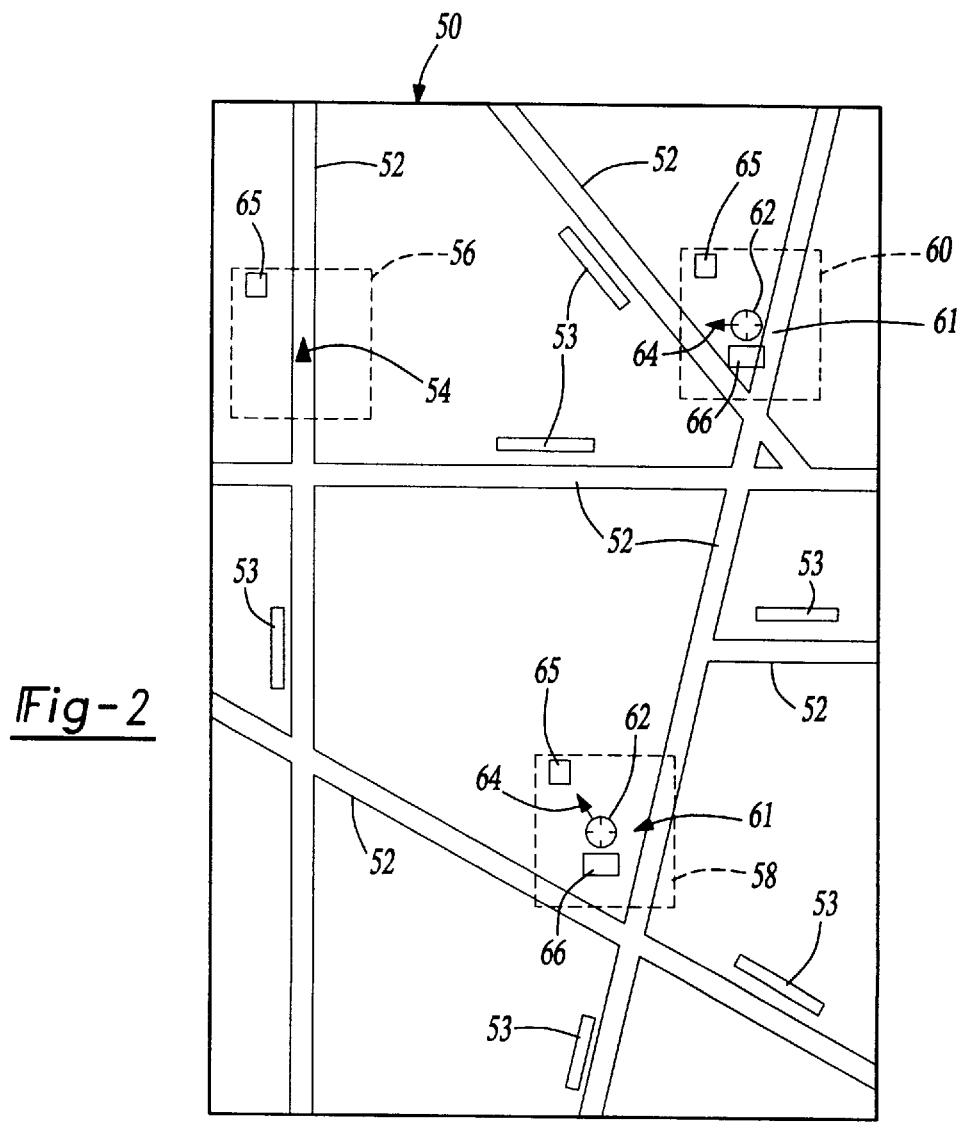
FIG. 2 is a top plan view of a map section located in a map database of the navigation system and a plurality of screen sections superimposed on the map section.

FIG. 2 is a top plan view of a map section 50 located in the database 28 of the navigation system 20. The map section 50 includes a plurality of roads 52. Adjacent each road 52 is a name field 53 that displays the name of the road 52. A current vehicle location cursor 54 is located at a first position on one of the roads 52 at the current vehicle location as determined by the CPU 22 and one of the position determining devices as described above. As will be understood the cursor 54 could also be located off-road and if navigation system 20 were not in a vehicle 32 then the cursor 54 would indicate the current position of the navigation system 20 relative to the map database 28.

Superimposed on the map section 50 are a first screen section 56, a second screen section 58 and a third screen section 60. Each of the screen sections 56–60 represent the area of the map section 50 that can be displayed at one time on the display device 24 at a given display scale. It should be recognized that the operation would be identical at any display scale. The second screen section 58 and the third screen section 60 represent panned sections of the map section 50 to which a user could selectively pan the display device 24. Each panned section, 58 and 60, includes a map panning directional indicator 61 having a cursor 62, such as a panning bullseye, which is located at a second position relative to the map database 28 in the center of the panned section. Attached to and projecting from each cursor 62 is a directional arrow 64. The map panning directional indicator 61 further includes a distance field 66 located adjacent to the cursor 62. Each screen section 56–60 also includes a current road field 65. When a screen section 56–60 is displayed on display device 24, the current road field 65 displays the name of the road that cursor 54 is on.

FIG. 3 is a screen display of the second screen section 58 as shown in FIG. 2 displayed on the display device 24. When a screen section 56–60 is displayed on the display device 24 it also includes a current heading field 68 that displays the current compass heading of the vehicle 32 or navigation system 20. The directional arrow 64 points toward the current vehicle location relative to the cursor 62 and is updated as the user pans the display device 24 to other screen sections 56–60. The distance field 66 shows the straight line distance between the cursor 62 and the current vehicle location. A user can select to have distance field 66 display the distance between cursor 62 and the current vehicle location 54 on a determined route as described below.

FIG. 4 is a top plan view of a directional user input device 26 that includes a directional input button 70 having a plurality of directional arrows 72. Preferably, there are eight directional arrows 72, but there could be four. Activation of one of the directional arrows 72 causes the display device 24 to pan the database 28 in the associated direction of the directional arrow 72.

In use, the map panning directional indicator 61 will be described as it would be used to pan the second screen section 58 described above. Initially, the display device 24 displays the first screen section 56 as shown in FIG. 2. The first screen section 56 includes a road 52 and the current vehicle location cursor 54 located at a first position which is the current vehicle location relative to map database 28, the position of the cursor 54 changes as the current vehicle location changes. In addition, the current heading field 68 would display the current compass heading of the vehicle 32. To begin panning the map section 50, the user presses one of the directional arrows 72 of the direction input button 70. The particular directional arrow 72 chosen would be the one oriented in the direction the user wishes to pan.

Each time a directional arrow 72 is pressed, another panned map section is displayed, holding down a directional arrow 72 pans continuously in the associated direction. As shown in FIG. 3, when a user is panning, the cursor 62 is superimposed in the center of the screen display of the panned map section at a second position relative to map database 28. Continuing to pan map database 28 moves cursor 62 to a third position, a fourth position and so on. The CPU 22 continuously calculates the heading between the cursor 62 and the current vehicle location cursor 54 using the latitude and longitude coordinates of each. In addition, the CPU 22 continuously calculates the distance between the cursor 62 and the current vehicle location cursor 54 either on a straight line or on a determined route.

Based on the heading calculated between the cursor 62 and the current vehicle location cursor 54, the CPU 22 indexes an array of pre-rendered bitmap symbols that define the position of the directional arrow 64 on the cursor 62 and displays the bitmap symbol on the panned map section. Preferably, the array of pre-rendered bitmaps includes at least eight bitmaps one each for the compass headings of north, northeast, east, southeast, south, southwest, west and northwest. Thus, a heading of approximately 315° between the cursor 62 and the current vehicle location 54 is represented by a bitmap having the directional arrow 64 positioned as shown in FIG. 3. When the heading changes, due to a change in either the current vehicle location 54 or the cursor 62, the CPU 22 indexes the array and displays a new bitmap as appropriate.

Most preferably, each bitmap would correspond to a range of compass headings. By way of example, a heading between approximately 337.5° to 22.5° would correspond to a directional arrow positioned at a compass position of north on the cursor 62. As would be understood by one of ordinary skill in the art, the number of pre-rendered bitmaps could be much larger than the eight compass headings described above to provide higher resolution of the heading.

The distance field 66 continuously updates the distance between the cursor 62 and the cursor 54 at the current vehicle location. The distance is expressed in either miles or kilometers as chosen by the user. The location of the distance field 66 relative to the cursor 62 is a function of the particular pre-rendered bitmap chosen. The distance field 66 is positioned below the cursor 62 when the directional arrow 64 is even with or above a heading of either east or west. The distance field 66 is positioned above the cursor 62 when the directional arrow 64 is below a heading of east or west, for example, a heading of south.

The route determination system 21 continuously determines a route from the first position or current vehicle location 54 to the cursor 62. When the determined route includes travel on roads 52 in map database 28, the route is determined based on the cost factors associated with each road segment as described above. The navigation system 20 can also determine a route that does not use any roads 52, as when vehicle 32 is off-road. The determined route is displayed on the display device 24. Depending on the scale, display device 24 may only display a portion of the determined route. The user can select to have distance field 66 display the distance between cursor 54 and cursor 62 on the determined route.

The present invention has been described in use in vehicle 32, obviously navigation system 20 need not be installed in vehicle 32. In that case, the navigation system 20 would operate as described above except the first position and cursor 54 would be the current navigation system 20 location relative to map database 28 and current heading field 68 would be the current heading of navigation system 20. In addition, the route would be determined between the current location of the navigation system 20 and the cursor 62.

The present invention has been described in accordance with the relevant legal standards, thus the foregoing description is exemplary rather than limiting in nature. Variations and modifications to the disclosed embodiment may become apparent to those skilled in the art and do come within the scope of this invention. Accordingly, the scope of legal protection afforded this invention can only be determined by studying the following claims.

I claim:

1. A method for indicating a position on a map of a navigation system, said method comprising the steps of:
    a.) determining a current vehicle location at a first position relative to a map database;
    b.) displaying a cursor at a second position relative to said map database;
    c.) computing a heading between said cursor and said current vehicle location; and
    d.) based on said heading, indicating a direction from one of said cursor and said current vehicle location to the other of said cursor and said current vehicle location simultaneously with said step b).

2. A method as recited in claim 1 comprising the further steps of:
    determining a current vehicle compass heading; and
    displaying said current vehicle compass heading on said display.

3. A method as recited in claim 1 wherein step c.) comprises the additional steps of:
    determining the latitude and the longitude coordinates of said second position;
    determining the latitude and the longitude coordinates of said first position;
    calculating an angle between said second position and said first position based on the coordinates; and
    determining said heading in said step c.) based on said angle.

4. A method as recited in claim 1 comprising the further steps of:
    determining a straight line distance between said second position and said first position; and
    displaying said straight line distance on said display.

5. A method as recited in claim 4 comprising the additional steps of:
    determining the latitude and the longitude coordinates of said second position;
    determining the latitude and the longitude coordinates of said first position; and
    determining said straight line distance based on the coordinates.

6. A method as recited in claim 1 further comprising the steps of:
    determining a route via said map database between said first position and said second position; and
    displaying at least a portion of said route on said display.

7. A method for indicating a position on a map of a navigation system, said method comprising the steps of:
    a.) determining a first position relative to a map database;
    b.) displaying on a display a cursor at a second position relative to said map database;
    c.) computing a heading between said second position and said first position;
    d.) based on said heading, indicating a direction from said second position to said first position;
    e.) moving said cursor from said second position to a third position relative to said map database;
    f.) computing a second heading between said third position and said first position; and
    g.) based on said second heading, indicating the direction from said third position to said first position said steps e)–g) being performed after said steps a)–d).

8. The method of claim 7, wherein the first position is a current location of the navigation system.

9. A method for indicating a position on a map of a navigation system, said method comprising the steps of:
    a.) deteimining a first position relative to a map database;
    b.) panning said display from a first screen section which includes said first position to a second screen section which does not include said first position;
    c.) displaying on a display a cursor at a second position in the second screen section relative to said map database;
    d.) computing a heading between said second position and said first position; and
    e.) based on said heading, indicating a direction from said second position to said first position.

10. The method of claim 9, wherein the first position is a current location of the navigation system.

11. A method for indicating a position on a map of a navigation system, said method comprising the steps of:
    a.) determining a first position relative to a map database;
    b.) displaying on a display a cursor at a second position relative to said map database;
    c.) computing a heading between said second position and said first position; and
    d.) indicating a direction from said second position to said first position by selecting one of a plurality of pre-rendered bitmaps based on said heading and displaying said selected bitmap on said display to indicate said direction.

12. The method of claim 11, wherein the first position is a current location of the navigation system.

13. A navigation system comprising:
    a map database;
    a display for displaying a screen section of said map database;
    a user input device for panning said screen section of said display relative to said map database;

a panning symbol on said screen section indicating a direction from one of a first location relative and said panning symbol to the other of said first location and said panning symbol.

14. A navigation system as recited in claim 13 further comprising:

a position determining device for determining a current position of said navigation system; and said current position being used as said first location.

15. A navigation system as recited in claim 13 wherein said display further displays a current compass heading of said navigation system.

16. A navigation system as recited in claim 13 wherein said display further displays a straight line distance from said first location to said panning symbol.

17. A navigation system comprising:

a map database;

a display for displaying a screen section of said map database;

a user input device for panning said screen section of said display relative to said map database;

a plurality of pre-rendered panning symbols, a first panning symbol of said pre-rendered panning symbols selected for display based on said position of said first location relative to said panning symbol, said first panning symbol on said screen section indicating a position of a first location relative to said panning symbol.

18. A navigation system comprising:

a map database;

a display for displaying a screen section of said map database;

a user input device for panning said screen section of said display relative to said map database;

a panning symbol on said screen section indicating a position of a first location relative to said panning symbol;

a route determination system calculating a route between said first location and said panning symbol; and said display displaying at least a portion of said route.

19. A navigation system comprising:

a database of road segments;

a display displaying a screen section of said database including a plurality of said road segments;

a user input device for selectively causing said display to pan through said database of road segments;

a position determining device for determining a current position relative to said database of road segments; and an indicator on said display indicating a direction of said current position relative to said indicator, wherein said indicator comprises one of a plurality of pre-rendered bitmap symbols, one of said pre-rendered bitmap symbols displayed based on said direction.

20. A navigation system comprising:

a database of road segments;

a display displaying screen section of said database including a plurality of said road segments;

a user input device for selectively causing said display to pan through said database of road segments;

a position determining device for determining a current position relative to said database of road segments; and an indicator on said display indicating a direction of said current position relative to said indicator wherein said display displays said indicator relative to said plurality of road segments.

21. A navigation system comprising:

a database of road segments;

a display displaying a screen section of said database including a plurality of said road segments;

a user input device for selectively causing said display to pan through said database of road segments;

a position determining device for determining a current position relative to said database of road segments;

a route determination system;

said route determination system determining a route on said database of roads between said current position and said indicator; and said display displaying said route and an indicator on said display indicating a direction of said current position relative to said indicator.

22. A navigation system comprising:

a database of road segments;

a display displaying a screen section of said database including a plurality of said road segments;

a user input device for selectively causing said display to pan through said database of road segments;

a position detennining device for determining a current position relative to said database of road segments;

an indicator on said display indicating a direction of said current position relative to said indicator; and said display further displays a distance between said current location and said indicator and said display displays a current compass heading of said navigation system.

\* \* \* \* \*

UNITED STATES PATENT AND TRADEMARK OFFICE
CERTIFICATE OF CORRECTION

PATENT NO.     : 6,175,801 B1
DATED          : January 16, 2001
INVENTOR(S)    : Millington It is certified that error appears in the above-identified patent and that said Letters Patent is hereby corrected as shown below:

<u>Title page,</u>
Item [73], should read -- [73] Assignee: Magellan DIS, Inc. Rochester Hills, MI (US) --

Signed and Sealed this

Sixth Day of August, 2002

Attest:

Attesting Officer

JAMES E. ROGAN
*Director of the United States Patent and Trademark Office*